United States Patent
Imaizumi

(10) Patent No.: US 7,486,389 B2
(45) Date of Patent: *Feb. 3, 2009

(54) LENS METER FOR MEASURING REFRACTIVE POWER DISTRIBUTION

(75) Inventor: Satoshi Imaizumi, Hoi-gun (JP)

(73) Assignee: Nidek Co., Ltd., Gamagori (JP)

( * ) Notice: Subject to any disclaimer, the term of this patent is extended or adjusted under 35 U.S.C. 154(b) by 128 days.

This patent is subject to a terminal disclaimer.

(21) Appl. No.: 11/327,324

(22) Filed: Jan. 9, 2006

(65) Prior Publication Data

US 2006/0152709 A1 Jul. 13, 2006

(30) Foreign Application Priority Data

Jan. 7, 2005 (JP) ............................. 2005-002823

(51) Int. Cl.
*G01B 9/00* (2006.01)
(52) U.S. Cl. .................................................... 356/124
(58) Field of Classification Search .......... 356/124–127
See application file for complete search history.

(56) References Cited

U.S. PATENT DOCUMENTS

| | | | | |
|---|---|---|---|---|
| 4,770,525 A | * | 9/1988 | Umeda et al. ................ | 353/122 |
| 5,173,739 A | | 12/1992 | Kurachi et al. | |
| 5,432,596 A | * | 7/1995 | Hayashi ........................ | 356/124 |
| 6,221,540 B1 | * | 4/2001 | Onoda et al. .................... | 430/5 |
| 6,476,909 B1 | * | 11/2002 | Nakayama et al. ......... | 356/239.2 |
| 2002/0021437 A1 | * | 2/2002 | Volkenandt et al. ......  | 356/124.5 |
| 2003/0043367 A1 | | 3/2003 | Kajino | |
| 2005/0219514 A1 | | 10/2005 | Imaizumi | |

FOREIGN PATENT DOCUMENTS

| | | |
|---|---|---|
| JP | A 4-66834 | 3/1992 |
| JP | A 9-33396 | 2/1997 |
| JP | A 11-125581 | 5/1999 |

OTHER PUBLICATIONS

Hori et al., "Application of Diffraction Optical Element to Measurement," Optical Alliance, Japan Industrial Publishing Co., Ltd., Tokyo pp. 36-39, Nov. 1998 w/translation.

* cited by examiner

*Primary Examiner*—Tarifur Chowdhury
*Assistant Examiner*—Tara S Pajoohi
(74) *Attorney, Agent, or Firm*—Oliff & Berridge, PLC

(57) ABSTRACT

A lens meter having a simple configuration, which is capable of precisely measuring optical characteristics such as refractive power distribution in a wide range of a subject lens to be measured at a time. The lens meter has a projection unit which projects a measurement light bundle, a projection lens which projects the measurement light bundle from the projection unit onto the subject lens placed on an optical axis of the projection lens, a diaphragm having an aperture disposed between the projection unit and the projection lens, and a two-dimensional photodetector which photo-receives the measurement light bundle passed through the subject lens after passed through the aperture of the diaphragm and the projection lens, and wherein the projection unit forms a target pattern, and the aperture of the diaphragm is disposed at a front focal point of the projection lens.

6 Claims, 3 Drawing Sheets

LENS METER FOR MEASURING REFRACTIVE POWER DISTRIBUTION

BACKGROUND OF THE INVENTION

1. Field of the Invention

The present invention relates to a lens meter for measuring optical characteristics of a subject lens to be measured.

2. Description of Related Art

In recent years, a lens meter has been proposed which can measure optical characteristics such as refractive power distribution in a wide range of a subject lens to be measured such as a progressive power lens at a time. For example, proposed is a lens meter which projects a number of convergent light bundles onto the subject lens using one light source and a microlens array with a number of microlenses, and measures the refractive power distribution based on a shift amount of positions of the light bundles passed through the subject lens (refer to Japanese Patent Application Unexamined Publication No. Hei9-33396).

However, the microlens array is high in cost. Moreover, in an optical system using the microlens array, a complicated configuration is required for selectively projecting the convergent light bundles through the microlenses onto the subject lens or for compensating for insufficiency of its light amount.

SUMMARY OF THE INVENTION

An object of the invention is to overcome the problems described above and to provide a lens meter having a simple configuration, which is capable of precisely measuring optical characteristics such as refractive power distribution in a wide range of a subject lens to be measured at a time.

To achieve the objects and in accordance with the purpose of the present invention, a lens meter has a projection unit which projects a measurement light bundle, a projection lens which projects the measurement light bundle from the projection unit onto the subject lens placed on an optical axis of the projection lens, a diaphragm having an aperture disposed between the projection unit and the projection lens, and a two-dimensional photodetector which photo-receives the measurement light bundle passed through the subject lens after passed through the aperture of the diaphragm and the projection lens, and wherein the projection unit forms a target pattern, and the aperture of the diaphragm is disposed at a front focal point of the projection lens.

Additional objects and advantages of the invention are set forth in the description which follows, are obvious from the description, or may be learned by practicing the invention. The objects and advantages of the invention may be realized and attained by the lens meter in the claims.

BRIEF DESCRIPTION OF THE DRAWINGS

The accompanying drawings, which are incorporated in and constitute apart of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
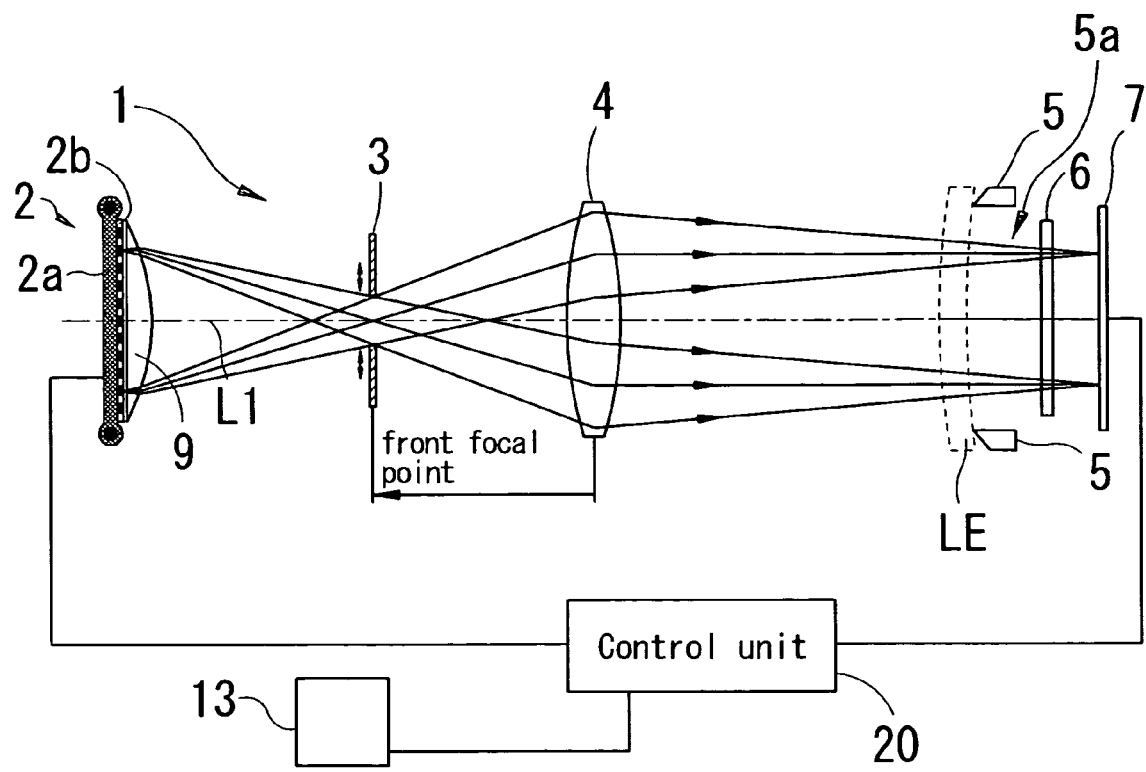
FIG. 1 is a view showing a schematic configuration of an optical system and a control system of a lens meter consistent with the preferred embodiment of the present invention.

A detailed description of one preferred embodiment of a lens meter embodied by the present invention is provided below with reference to the accompanying drawings. FIG. 1 is a view showing a schematic configuration of an optical system and a control system of a lens meter consistent with the preferred embodiment of the present invention.

A projection optical system 1 for projecting measurement light bundles onto a subject lens LE to be measured includes a projection unit 2, a diaphragm 3, a projection lens 4, and a field lens 9.

Figure 2:
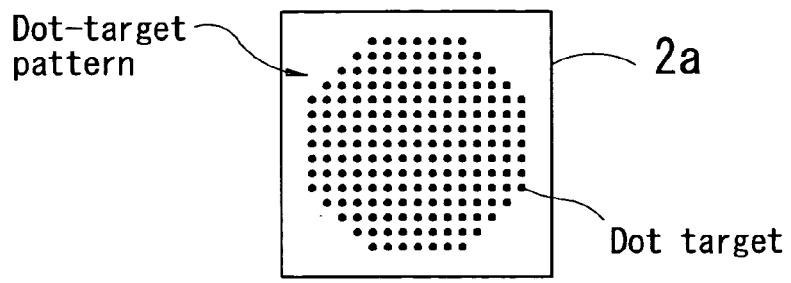
FIG. 2 is a view showing a dot-target pattern formed (displayed) on a liquid crystal panel.

The projection unit 2 includes a light source unit 2a and a liquid crystal panel 2b for selectively transmitting a light bundle emitted from the light source unit 2a in a predetermined target pattern (for example, a dot-target pattern shown in FIG. 2). In the present embodiment, the light source unit 2a includes a light source such as one or more LEDs and a fluorescent lamp, and a diffusing member for diffusing the light bundle emitted from the light source. Besides, the light source unit 2a may be a vertical cavity surface emitting light source and the like emitting a diffused light bundle two-dimensionally. In addition, the light source unit 2a and the liquid crystal panel 2b are used to constitute the projection unit 2 in the present embodiment; however, the present invention is not limited thereto, and it is essential only that the projection unit 2 is constituted so that the projection can be made while the target pattern is formed under electric control. For example, a display panel utilizing an organic light emitter such as an organic electroluminescence display and a field emission display may be employed.

The diaphragm 3 is provided with a diameter-variable circular aperture (opening) having a measurement optical axis L1 as its center, which is an optical axis of the projection lens 4, and limits the measurement light bundles from the projection unit 2. The aperture of the diaphragm 3 is disposed at a front focal point of the projection lens 4 between the projection unit 2 and the projection lens 4, and the aperture of the diaphragm 3 and the projection lens 4 constitute an image-side telecentric optical system. In addition, the field lens 9 is disposed between the projection unit 2 and the diaphragm 3 so as to bring the position of the aperture of the diaphragm 3 to its back focal point.

A nosepiece (lens rest) 5 is provided with a circular aperture (opening) 5a having the optical axis L1 as its center, and supports the lens LE on the aperture 5a. The projection lens 4 projects the measurement light bundles passed through the aperture of the diaphragm 3 onto the lens LE supported on the nosepiece 5. A bandpass filter 6 passes only the measurement light bundles in the vicinity of e-line (546.07 nm) among the measurement light bundles passed through the lens LE and the aperture 5a. A two-dimensional photodetector 7 such as an area CCD photo-receives the measurement light bundles passed through the filter 6.

Figure 3:
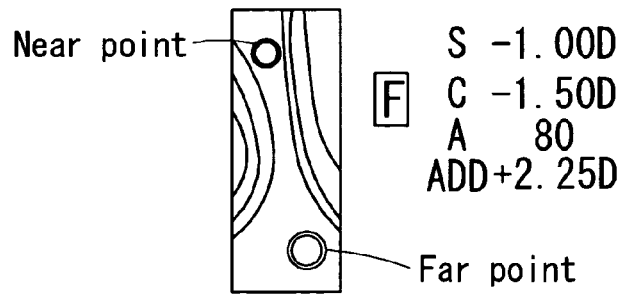
FIG. 3 is a view showing a display example of a map of refractive power distribution of a subject lens to be measured.

When a target pattern for refractive power distribution measurement is formed (displayed) on the liquid crystal panel 2b, the measurement light bundles brought by the light bundle from the light source unit 2a pass through the field lens 9, the aperture of the diaphragm 3 and the projection lens 4, and principal rays of the measurement light bundles are made parallel to the optical axis L1 to be projected onto the lens LE. At this time, the measurement light bundles are converged by the projection lens 4 and projected onto the lens LE. The measurement light bundles passed through the lens LE are photo-received on the photodetector 7 via the filter 6. Accordingly, images in the predetermined target pattern are formed (projected) on the photodetector 7. A control unit 20 detects positions of the target pattern images based on output signals from the photodetector 7 and obtains refractive power distribution of the lens LE based on detection results. In addition, the control unit 20 controls to display the obtained refractive power distribution as a map on a monitor 13 (see FIG. 3). Incidentally, the control unit 20 also performs control and the like of the whole lens meter.

For example, when a dot-target pattern as shown in FIG. 2 (where only dot-target parts transmit light and the remaining region shields light) is formed (displayed) on the liquid crystal panel 2b, the illumination by the light source unit 2a is made from behind of the liquid crystal panel 2b as if a number of minute light sources are two-dimensionally disposed. Then, a plurality of measurement light bundles by the dot-target pattern are projected onto the lens LE, thereby forming (projecting) an image of the dot-target pattern on the photodetector 7. Incidentally, in the present embodiment, a dot-target image refers to an image of one dot target formed (projected) on the photodetector 7, and a dot-target pattern image refers to a two-dimensional gathering of dot-target images formed (projected) on the photodetector 7.

Figure 4A:
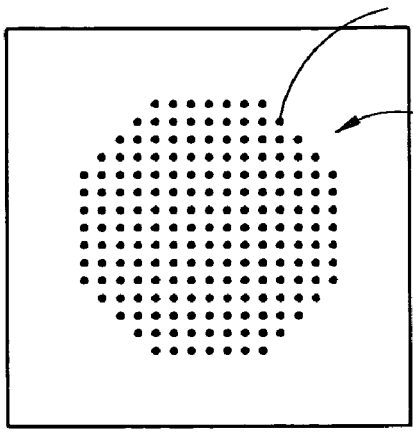
FIGS. 4A to 4E are views showing examples of a dot-target pattern image formed (projected) on a two-dimensional photodetector.
Figure 4B:
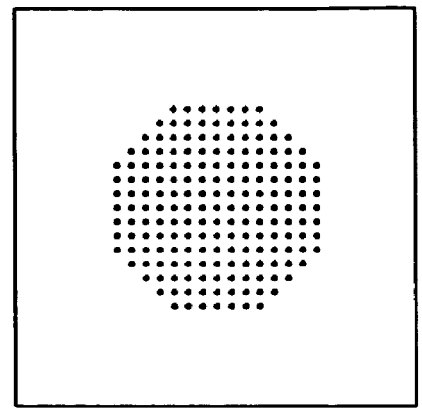
Figure 4C:
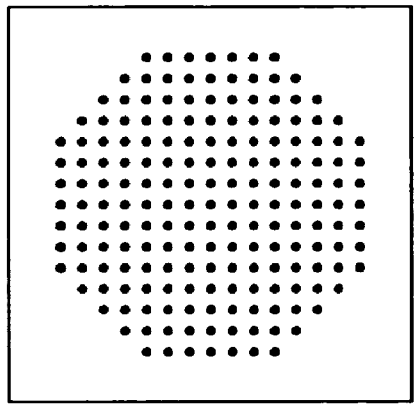
Figure 4D:
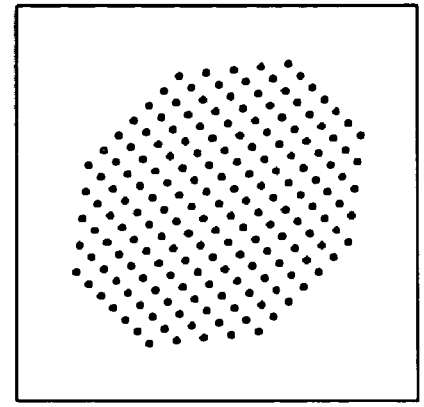
Figure 4E:
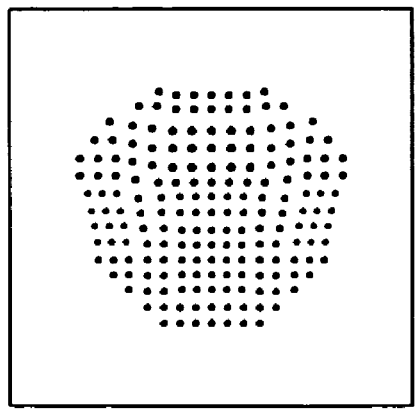

FIG. 4A shows a dot-target pattern image when the lens LE is not placed on the nosepiece 5. FIG. 4B shows a dot-target pattern image when the lens LE with positive spherical power is placed, where spaces between the respective dot-target images are narrowed to form a perfect circle as compared to the case where the lens LE is not placed. FIG. 4C shows a dot-target pattern image when the lens LE with negative spherical power is placed, where spaces between the respective dot-target images are widened to form a perfect circle as compared to the case where the lens LE is not placed. FIG. 4D shows a dot-target pattern image when the lens LE with astigmatism (cylindrical power) is placed, where the dot-target pattern image is scaled up or scaled down to form an oval as compared to the case where the lens LE is not placed. FIG. 4E shows a dot-target pattern image when the lens LE with progressive power is placed, where spaces between the respective dot-target images are narrowed gradually from a far point to a near point.

The control unit 20 detects positions of the respective dot-target images formed (projected) on the photodetector 7, and obtains shift amounts of the positions of the respective dot-target images with reference to their positions when the lens LE is not placed. The control unit 20, which can obtain optical characteristics such as spherical power, cylindrical power and an astigmatic axial angle based on the shift amounts of the positions of at least three dot-target images, can obtain the refractive power distribution of the lens LE by regarding four adjacent dot-target images as one group and obtaining the optical characteristics for the each group.

Consequently, owing to the configuration above, the obtainment of the refractive power distribution of the subject lens with a simple configuration can be achieved by using a liquid crystal panel and a light source which are low in cost instead of using a microlens array and the like which are high in cost. Further, the use of a self-emitting display panel such as an organic electroluminescence display instead of the liquid crystal panel allows a dot-target pattern image more excellent in contrast to be obtained.

Incidentally, the target pattern formed (displayed) on the liquid crystal panel 2b, which can be arbitrarily set, is not limited to the dot-target pattern as in the present embodiment, and a multiple ring-target pattern or a grid-target pattern can also be formed (displayed) thereon.

Further, for obtaining a sufficient photo-receiving amount on the photodetector 7 in order to improve an S/N ratio, the diameter of the aperture of the diaphragm 3 can be enlarged or the number of light sources used in the light source unit 2a can be increased, whereby the photo-receiving amount can be increased with ease. In contrast, when one light source and a microlens array with a number of microlenses are used, it is inevitable to use a high intensity light source and a high sensitive photodetector which are high in cost, leading to increase in cost.

In addition, as for the measurement light bundles from a peripheral portion of the projection unit 2 (i.e., a peripheral portion relative to a central portion within the projection unit 2), an amount of light reaching the aperture of the diaphragm 3 tends to get smaller than that of the measurement light bundles from the vicinity of the optical axis L1; however, by disposing the field lens 9 between the projection unit 2 and the aperture of the diaphragm 3 as in the present embodiment, even the measurement light bundles from the peripheral portion of the projection unit 2 reach the aperture of the diaphragm 3 with little reduction in the amount of light. Accordingly, accuracy in detection of the positions of the target pattern images is improved. Besides, for effectively guiding the measurement light bundles from the peripheral portion of the projection unit 2 to the aperture of the diaphragm 3, it is preferable to dispose the field lens 9 as close as possible to the projection unit 2.

Besides, though the liquid crystal panel 2b is used in the projection unit 2 to form the target pattern in the present embodiment, the present invention is not limited thereto. A target plate in which a target pattern is formed (for example, a target plate with a number of circular pinholes (openings)) may be used.

Incidentally, in the present embodiment, a position of the projection lens 4 is disposed so that the liquid crystal panel 2b and the photodetector 7 are made conjugate in a case where the lens LE with a specific diopter in the vicinity of 0D or with a frequently-used specific diopter (in the vicinity of −1D to −2D) is placed on the optical axis L1. Accordingly, the target pattern images on the photodetector 7 are formed (projected) by the measurement light bundles converged by the projection lens 4. As a result, even if there is a scratch or soil at a part on the lens LE, on which the measurement light bundle falls, inconsistency in light intensity hardly occurs to the target pattern images and the photo-receiving amount becomes large. Therefore, the S/N ratio is improved to stabilize the accuracy in detection of the positions of the target pattern images. Besides, the position of the projection lens 4 is not limited hereto and may be disposed, for example, so that the liquid crystal panel 2b and the lens LE are made conjugate. In addition, it is preferable that a display screen of the liquid crystal panel 2b is in such a size that allows the measurement light bundles to be projected onto a wide range including at least a far point and a near point of a commonly used progressive power lens.

Figure 5A:
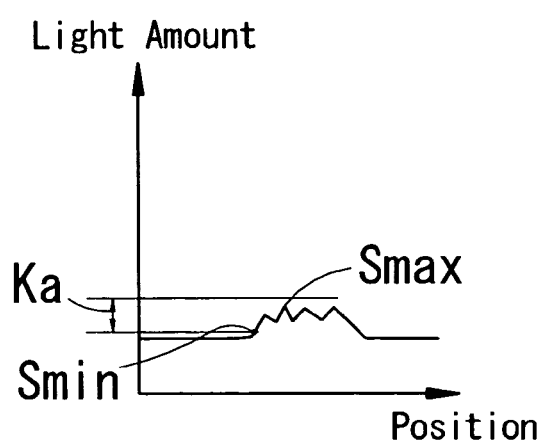
FIGS. 5A and 5B are graphs showing examples of a change in a photo-receiving amount of a measurement light bundle (a dot-target image).
Figure 5B:
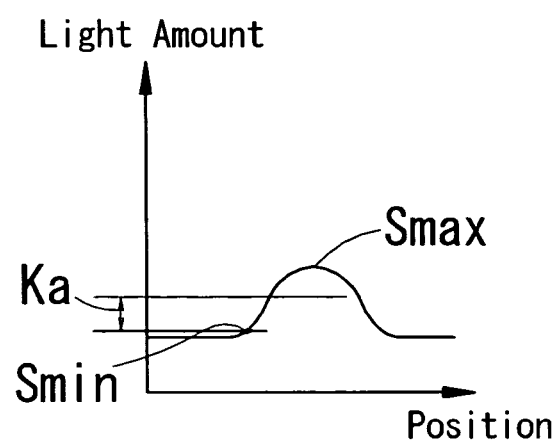

Next, description will be given to a case where the refractive power distribution of the lens LE with a scratch or soil is measured. FIG. 5A is a view showing a change in the photo-receiving amount of the measurement light bundle (dot-target image) in a case where there is a scratch or soil on the lens LE, on which the measurement light bundle falls. When the measurement light bundle passes through a part with the scratch or soil on the lens LE, the dot-target image on the photodetector 7 is deformed to decrease the photo-receiving amount. Therefore, the accuracy in detection of the positions of the dot-target images is lowered, leading to low measurement accuracy. Here, the control unit 20 judges whether repellence occurs to the measurement light bundles based on whether there is a decrease in the photo-receiving amount of the respective dot-target images detected by the photodetector 7. For example, the control unit 20 calculates a difference between Smin, the rising edge in the photo-receiving amount of the dot-target image, and Smax, the peak in the photo-receiving amount of the dot-target image, and when the photo-receiving amount difference is smaller than Ka: a predetermined permissible range, controls to widen the dot target on the liquid crystal panel 2b corresponding to the dot-target image. The widening of the dot target allows the diameter of the measurement light bundle passing through the lens LE to be widened, enlarging the dot-target image on the photodetector 7. FIG. 5B is a view showing a change in the photo-receiving amount of the dot-target image in a case where the dot target is widened.

As mentioned above, when the photo-receiving amount difference exceeds the permissible range Ka so that the sufficient photo-receiving amount may be secured, the accuracy in detection of the positions of the dot-target images is improved. Besides, in the present embodiment, the dot targets formed (displayed) on the liquid crystal panel 2b are changed in size to change the diameters of the measurement light bundles; however, the present invention is not limited thereto, and the diameters of the measurement light bundles may also be changed by varying the diameter of the aperture of the diaphragm 3. In addition, as for a criteria for judging whether or not repellence occurs to the measurement light bundles, the judgment may be made based on whether a waveform of photo-receptive signals of the respective dot-target images is symmetrical or asymmetrical while the judgment is made based on whether or not the photo-receiving amount of the respective dot-target images is decreased in the present embodiment.

In addition, in accordance with the widening of the dot targets, it is considered that the images of the adjacent dot targets could overlap each other. In such a case, it is possible to partially control the formation (display) of the dot-target pattern so that the dot-target images by the dot-target pattern formed (displayed) on the liquid crystal panel 2b do not overlap each other. Besides, in forming (displaying) the multiple ring-target pattern on the liquid crystal panel 2b, if repellence occurs to the measurement light bundles, the width of a ring target in a related part may be enlarged. In addition, in forming (displaying) the grid-target pattern on the liquid crystal panel 2b, if repellence occurs to the measurement light bundles, the width of a grid target in a related part may be enlarged. That is to say, even if repellence occurs to the measurement light bundles, it is necessary only to control the target pattern formed (displayed) on the liquid crystal panel 2b so that a part or a whole of the measurement light bundles passing through the lens LE becomes thick.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter for measuring refractive power distribution in a wide range of a subject lens to be measured, the lens meter comprising:
    a measurement optical system including:
        a projection unit having a light source and a target plate, which projects a target pattern for refractive power distribution measurement.
        a projection lens,
        a diaphragm having an aperture disposed at a front focal point of the projection lens between the projection unit and the projection lens, wherein a diameter of the aperture is variable,
        a field lens disposed between the projection unit and the aperture, wherein the aperture is disposed at a back focal point of the field lens, and
        a two-dimensional photodetector which detects an image of the target pattern passed through the subject lens, which is disposed so as to have a conjugate relation with the target plate with respect to the projection lens and the subject lens in a case where the subject lens with one of a specific diopter in the vicinity of 0D and a frequently-used specific diopter is placed in a measurement position; and
    a control device that changes a size of each measurement light bundle of the target pattern by changing the diameter of the aperture based on an output signal from the photodetector, and obtains the refractive power distribution.

2. The lens meter according to claim 1, wherein the target pattern is a dot-target pattern having a plurality of dot targets, and
    the control device changes the diameter of the aperture based on at least one of a light intensity and number of images of the dot targets, which are obtained from the output signal from the photodetector.

3. The lens meter according to claim 1, wherein the control device changes the diameter of the aperture in selected one of cases where an insufficient photo-receiving amount of the target pattern is obtained on the photodetector and where an asymmetrical waveform of a photo-receptive signal of the target pattern is obtained on the photodetector.

4. A lens meter for measuring refractive power distribution in a wide range of a subject lens to be measured, the lens meter comprising:
    a measurement optical system including:
        a display panel which forms a target pattern for refractive power distribution measurement and projects the thus-formed target pattern onto a screen under electric control,
        a projection lens,
        a diaphragm having an aperture disposed at a front focal point of the projection lens between a projection unit and the projection lens,
        a field lens disposed between the projection unit and the aperture, wherein the aperture is disposed at a back focal point of the field lens, and
        a two-dimensional photodetector which detects an image of the target pattern passed through the subject lens, which-is disposed so as to have a conjugate relation with the target plate with respect to the projection lens and the subject lens in a case where the subject lens with one of a specific diopter in the vicinity of 0D and a frequently-used specific diopter is placed in a measurement position; and a control device that changes a size of each measurement light bundle of the target pattern by changing the selected one of the diameter of the aperture and the target pattern based on an output signal from the photodetector, and obtains the refractive power distribution.

5. The lens meter according to claim 4, wherein the target pattern is a dot-target pattern having a plurality of dot targets, and the control device changes a selected one of the diameter of the aperture and the target pattern based on at least one of a light intensity and number of images of the dot targets, which are obtained from the output signal from the photodetector.

6. The lens meter according to claim 4, wherein the control device changes selected one of the diameter of the aperture and the target pattern, in selected one of cases where an insufficient photo-receiving amount of the target pattern is obtained on the photodetector and where an asymmetrical waveform of a photo-receptive signal of the target pattern is obtained on the photodetector.

* * * * *